United States Patent
Shao

(10) Patent No.: US 11,017,516 B2
(45) Date of Patent: May 25, 2021

(54) FORGERY DETECTION SYSTEM AND ITS METHOD FOR FALSIFIED BIOMEDICAL EXPERIMENT IMAGES

(71) Applicant: FU JEN CATHOLIC UNIVERSITY, New Taipei (TW)

(72) Inventor: Hao-Chiang Shao, Taoyuan (TW)

(73) Assignee: FU JEN CATHOLIC UNIVERSITY, New Taipei (TW)

( * ) Notice: Subject to any disclaimer, the term of this patent is extended or adjusted under 35 U.S.C. 154(b) by 141 days.

(21) Appl. No.: 16/394,082

(22) Filed: Apr. 25, 2019

(65) Prior Publication Data

US 2020/0273157 A1   Aug. 27, 2020

(30) Foreign Application Priority Data

Feb. 26, 2019   (TW) ................. 108106526

(51) Int. Cl.
    *G06T 5/50*    (2006.01)
    *G06T 7/00*    (2017.01)

(52) U.S. Cl.
    CPC .............. *G06T 7/0002* (2013.01); *G06T 5/50* (2013.01); *G06T 7/0012* (2013.01); *G06T 2207/30168* (2013.01)

(58) Field of Classification Search
    None
    See application file for complete search history.

(56) References Cited

U.S. PATENT DOCUMENTS

2020/0242761 A1* 7/2020 Butler .................... A61B 6/505

* cited by examiner

*Primary Examiner* — Idowu O Osifade

(57) ABSTRACT

The present invention relates to a forgery detection system and its method for biomedical experiment images, especially for molecular-biological experiment images, such as western blot (WB) and polymerase chain reaction (PCR) results. The forgery detection system mainly comprises a processing module, an image difference computing module, a thresholding module, and an image mixing module are formed in an image analyzing device in the form of a library, a variable or an operand. Moreover, the processing module has a quantization parameter establishing unit, a similar computing unit, and a pseudo background generating unit. The purpose of the image analyzing device is to display an artificial image on the input image.

8 Claims, 4 Drawing Sheets

FORGERY DETECTION SYSTEM AND ITS METHOD FOR FALSIFIED BIOMEDICAL EXPERIMENT IMAGES

BACKGROUND OF THE INVENTION

1. Field of the Invention

The present invention relates to the technology field of image detection, and more particularly to a forgery detection system and its method for falsified biomedical experiment images.

2. Description of the Prior Art

In the papers of general biomedical related fields, it is often seen that researchers will adapt or copy images in order to cater to their own experimental results and theories, and in the process of transforming or copying images, the deformer first partially cuts or adjusts the image from the same sample, and then copies part of the image after cutting or adjusting the position into the sample, and marks the altered image as a different sample or process result.

With the development of digital image processing technology, the existing methods of falsifying images are mainly divided into three types: 1. Repetitive use of the same image: the same image was used as the experimental result between experiments labeled as different samples or treatments. 2. Use the same image after cutting and adjusting the position: in the biochemical electrophoresis or microscopic image, a part of the image from the same sample is cut and selected, and after being inverted, it is marked as a different sample or processed. 3. After the alteration, use the same image: crop the image or change the position, and partially copy and add a part of the image to the original image, or color the shadow and erase some details.

However, in the above-mentioned method of falsifying images, the images and experimental results changed by improper post-processing are not accurate, which seriously affects the development of biotechnology.

From above descriptions, it is understood that there are still experimental results of altered images in the field of biomedical research. In view of that, the inventor of the present application has made great efforts to make inventive research thereon and eventually provided a forgery detection system and its method for falsified biomedical experiment images.

SUMMARY OF THE INVENTION

The primary objective of the present invention is to provide a forgery detection system and its method for falsified biomedical experiment images. he forgery detection system mainly comprises a processing module, an image difference computing module, a thresholding module, and an image mixing module are formed in an image analyzing device in the form of a library, a variable or an operand. Moreover, the processing module has a quantization parameter establishing unit, a similar computing unit and a pseudo background generating unit. The purpose of the image analyzing device is to display an artificial image on the input image. In addition, when the quantization parameter is insufficient or does not need to be quantitatively analyzed, the processing module specially designed by the present invention has a two-dimensional Gaussian low-pass filtering unit, a parameter setting unit and a pseudo background establishing unit, and then the processing is performed. The processing module only needs to perform image detection of the input image by using Gaussian blurring.

In order to achieve the primary objective of the present invention, the inventor of the present invention provides an embodiment for the forgery detection system, comprising:
an image receiving device for receiving an input image;
an image analysis device, comprises:
  a processing module for receiving the input image, and performing a pseudo background generation process on the input image, thereby obtaining a pseudo background image;
  an image difference computing module, being coupled to the processing module, and performing an image difference operation on the pseudo background image and the input image to obtain a volatility pattern;
  a thresholding module, being coupled to the image difference computing module, and performing a binarization process on the volatility pattern to obtain an indicator image;
  an image mixing module, being coupled to the thresholding module, and performing a mixing operation on the indicator image and the input image to obtain a background noise distribution control image; and
  an image display module, being coupled to the image mixing module, and displaying the background noise distribution control image, thereby completing the image detection of the input image.

In order to achieve the primary objective of the present invention, the inventor of the present invention provides an embodiment for the method of forgery detection for falsified biomedical experiment images, comprising the steps of:
(1) providing an image receiving device to receive an input image;
(2) Providing a processing module to receive the input image, and performing a pseudo background generation process on the input image to obtain a pseudo background image;
(3) Providing an image difference computing module for performing an image difference operation on the pseudo background image and the input image, thereby obtaining a volatility pattern;
(4) Performing an image normalization range establishing operation on the volatility pattern through a range establishing unit, and setting a specified threshold value of the volatility pattern by a setting unit;
(5) Providing a thresholding module and performing a binarization process on the volatility pattern according to the specified threshold value, thereby obtaining an indicator image;
(6) Providing an image mixing module to perform a mixing operation on the indicator image and the input image to obtain a background noise distribution control image; and
(7) Providing an image display module to display the background noise distribution control image, thereby completing image detection of the input image.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe the proposed forgery detection system and its method for falsified biomedical experiment images, embodiments of the present invention will be described in detail with reference to the attached drawings hereinafter.

Figure 1:
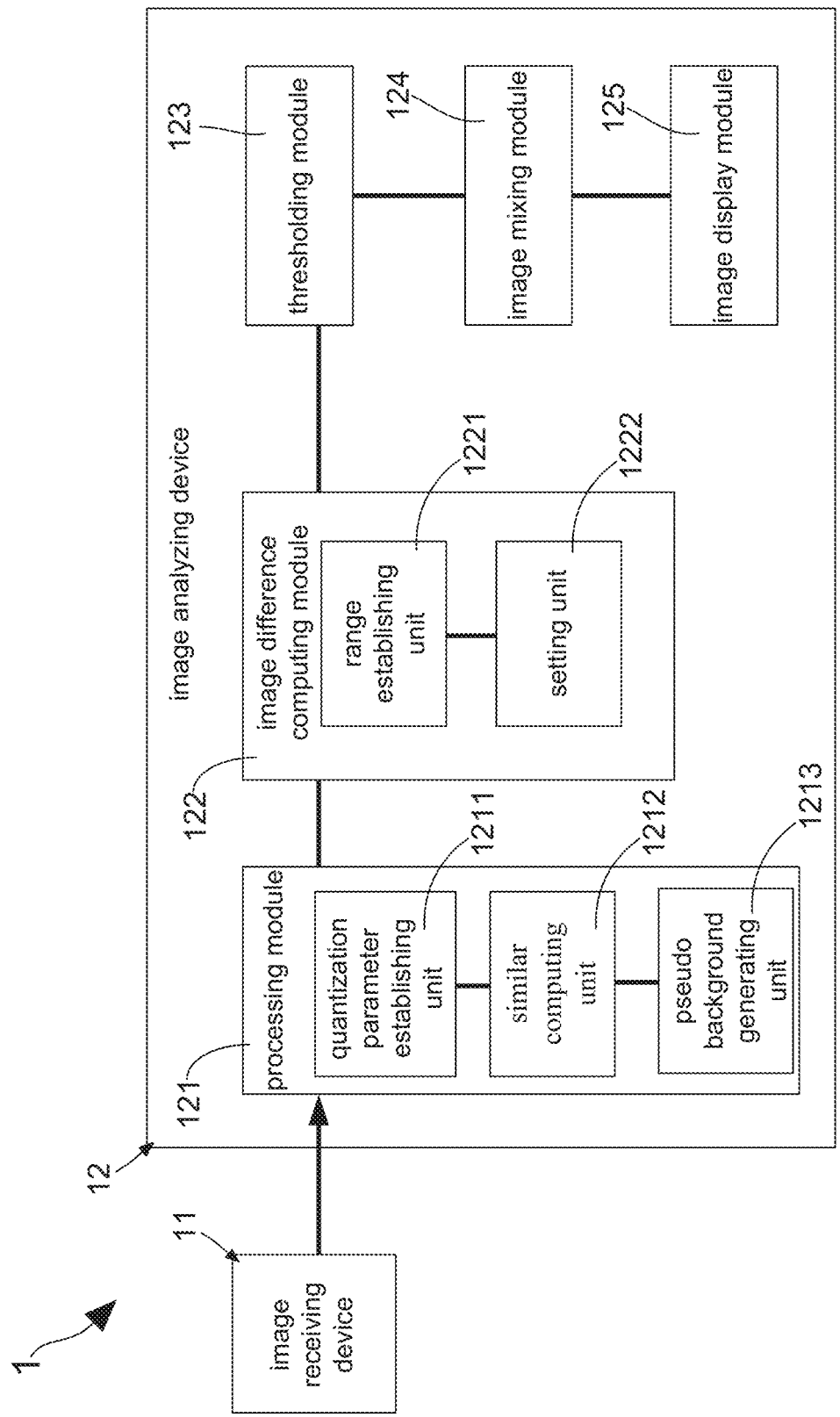
FIG. 1 is a first architecture diagram illustrating a forgery detection system according to the invention.

Before describing the forgery detection system and its method for biomedical experiment images of the present invention, it is necessary to introduce the forgery detection system. Please refer to FIG. 1, which is a first architecture diagram illustrating a forgery detection system according to the invention. The first forgery detection system 1 of the present invention comprises: an image receiving device 11 and an image analyzing device 12, the image receiving device 11 for receiving an input image I. Furthermore, the input image I is a biomedical experimental image formed by a western blot (WB) or a polymerase chain reaction (PCR), and the image analyzing device 12 further comprises: a processing module 121, an image difference computing module 122, a thresholding module 123, an image mixing module 124, and an image display module 125, wherein the processing module 121 for receiving the input image I, and further perform a pseudo background on the input image I, thereby obtaining a pseudo background image $\mathcal{J}$, wherein the image difference computing module 122 is coupled to the processing module 121 for performing an image difference operation on the pseudo background image $\mathcal{J}$ and the input image I to obtaining a volatility pattern $\mathcal{V}$, and the thresholding module 123 is coupled to the image difference computing module 122 for performing a binarization process on the volatility pattern $\mathcal{V}$ to obtain an indicator image $M_{\lambda, \gamma}$, and the image mixing module 124 is coupled to the thresholding module 123 for performing a mixing operation on the indicator image $M_{\lambda, \gamma}$ and the input image I to obtain a background noise distribution control image, and the image display module 125 is coupled to the image mixing module 124 for determining whether the background noise distribution control image is altered, whereby the image detection is accomplished the input image I. The processing module 121, the image difference computing module 122, the thresholding module 123, and the image mixing module 124 are formed in the image analysis device 12 in the form of a library, a variable, or an operand. Moreover, an engineer familiar with image analysis processing and image detection technology can easily know that the image analysis device 12 is any of the following: a tablet, a notebook, a desktop, or a central processing unit.

In the present invention, the processing module 121 further comprises: a quantization parameter establishing unit 1211, a similar computing unit 1212, and a pseudo background generating unit 1213. When performing the pseudo background generation process, the quantization parameter establishing unit 1211 for performing an image quantization parameter establishing operation on the input image I, and establishing an operation result according to the image quantization parameter to establish a quantization parameter matrix, and similar computing unit 1212 is coupled to the quantization parameter establishing unit 1211, and performing a similarity calculation on the input image I and the pseudo background image $\mathcal{J}$, and the pseudo background generating unit 1213 is coupled to the similar computing unit 1212. Moreover, the pseudo background image $\mathcal{J}$ is generated by performing a Fourier transform on the quantization parameter matrix and the result of the similarity calculation, wherein the pseudo background image $\mathcal{J}$ uses the following expression (1), (2), (3), (4), (5), and (6) are completed.

$$\min_{\mathcal{J}} \|I - \mathcal{J}\|_F^2 + \lambda \|h * \mathcal{J}\|_F^2 \quad (1)$$

$$\mathcal{L} = \|I - \mathcal{J}\|_F^2 + \lambda \|h * \mathcal{J}\|_F^2 = tr\{(I - \mathcal{J})(I - \mathcal{J})^t\} + tr\{H\mathcal{J}H^t\mathcal{J}^tH\} \quad (2)$$

$$\frac{\partial}{\partial \mathcal{J}}\mathcal{L} = 0 = 2\mathcal{J}^t - 2I^t + 2\lambda(H^tH\mathcal{J}^tH^tH) \quad (3)$$

$$I = \mathcal{J} + \lambda(H^tH\mathcal{J}H^tH) \quad (4)$$

$$I = \mathcal{J} + \lambda(h^t * (h * \mathcal{J})) \quad (5)$$

$$\mathcal{J} = F^{-1}\left\{\frac{F\{I\}}{[1] + \lambda F\{h^t\} \circ F\{h\}]}\right\} \quad (6)$$

In the arithmetic expressions (1) to (6) of the pseudo background image $\mathcal{J}$, $\mathcal{J}$ is a pseudo background image, I is an input image, $\|I - \mathcal{J}\|_F^2$ is to calculate a similar value of the input image I and the pseudo background image $\mathcal{J}$, $\lambda \|h * \mathcal{J}\|_F^2$ is the penalty term calculated for the smoothness of the pseudo background image $\mathcal{J}$, H is Toeplitz matrix of a 1D k-tap-long high-pass filter f, h is quantization parameter matrix, t is matrix transposition, $\circ$ is Hadamard product, $F\{I\}$ is Fourier transform for I, $F\{h^t\}$ is a Fourier transform on $h^t$, $$F^{-1}\left\{\frac{F\{I\}}{[1] + \lambda F\{h^t\} \circ F\{h\}]}\right\}$$

is performing a Fourier inverse transform on $$\left\{\frac{F\{I\}}{[1] + \lambda F\{h^t\} \circ F\{h\}]}\right\},$$

thereby obtaining a pseudo background image $\mathcal{J}$, wherein the parameter value of $\lambda$ is 0.00005, $h = f_{k \times 1} f_{1 \times k}^t$, and f is a vector of $[1, -2, 1]$. As shown in the following equation (7), h represents the quantization parameter matrix.

$$h = \begin{bmatrix} 1 & -2 & 1 \\ -2 & 4 & -2 \\ 1 & -2 & 1 \end{bmatrix} \quad (7)$$

According to the above description, if the arithmetic expression (5) is used, h can be directly specified as another parameter matrix without specifying f, and the h is as shown in the following equation (8).

$$h = \begin{bmatrix} -0.0751 & -0.1238 & -0.0751 \\ -0.1238 & 0.7958 & -0.1238 \\ -0.0751 & -0.1238 & -0.0751 \end{bmatrix} \quad (8)$$

After obtaining the pseudo background image $\mathcal{J}$, the image analysis device 12 then causes the image difference computing module 122 to perform the image difference calculation on the pseudo background image $\mathcal{J}$ and the input image I; wherein the image difference operation uses the following operation completed by equation (9).

$$\mathcal{V} = |I - \mathcal{J}| \tag{9}$$

In the arithmetic expression (9) of the image difference calculation, I is an input image, $\mathcal{J}$ is a pseudo background image, and $|I-\mathcal{J}|$ is an absolute value of the difference between the input image I and the pseudo background image $\mathcal{J}$, thereby obtaining a volatility pattern $\mathcal{V}$.

After obtaining the volatility pattern $\mathcal{V}$, the image analyzing device 12 then causes a range establishing unit 1221 of the image difference computing module 122 to perform an image normalization range establishing operation on the volatility pattern $\mathcal{V}$ and pass through one of the image difference computing modules 122. After the setting unit 1222 sets a specified threshold value γ of the one of the volatility patterns $\mathcal{V}$, the image analyzing device 12 then causes the thresholding module 123 to perform the binarization processing on the volatility pattern $\mathcal{V}$ according to the specified threshold value γ. This obtains the indicator image $M_{\lambda,\gamma}$. In the present invention, the specified threshold value γ can be 0.5, 0.1, 0.0001, or 0.00001.

Figure 2:
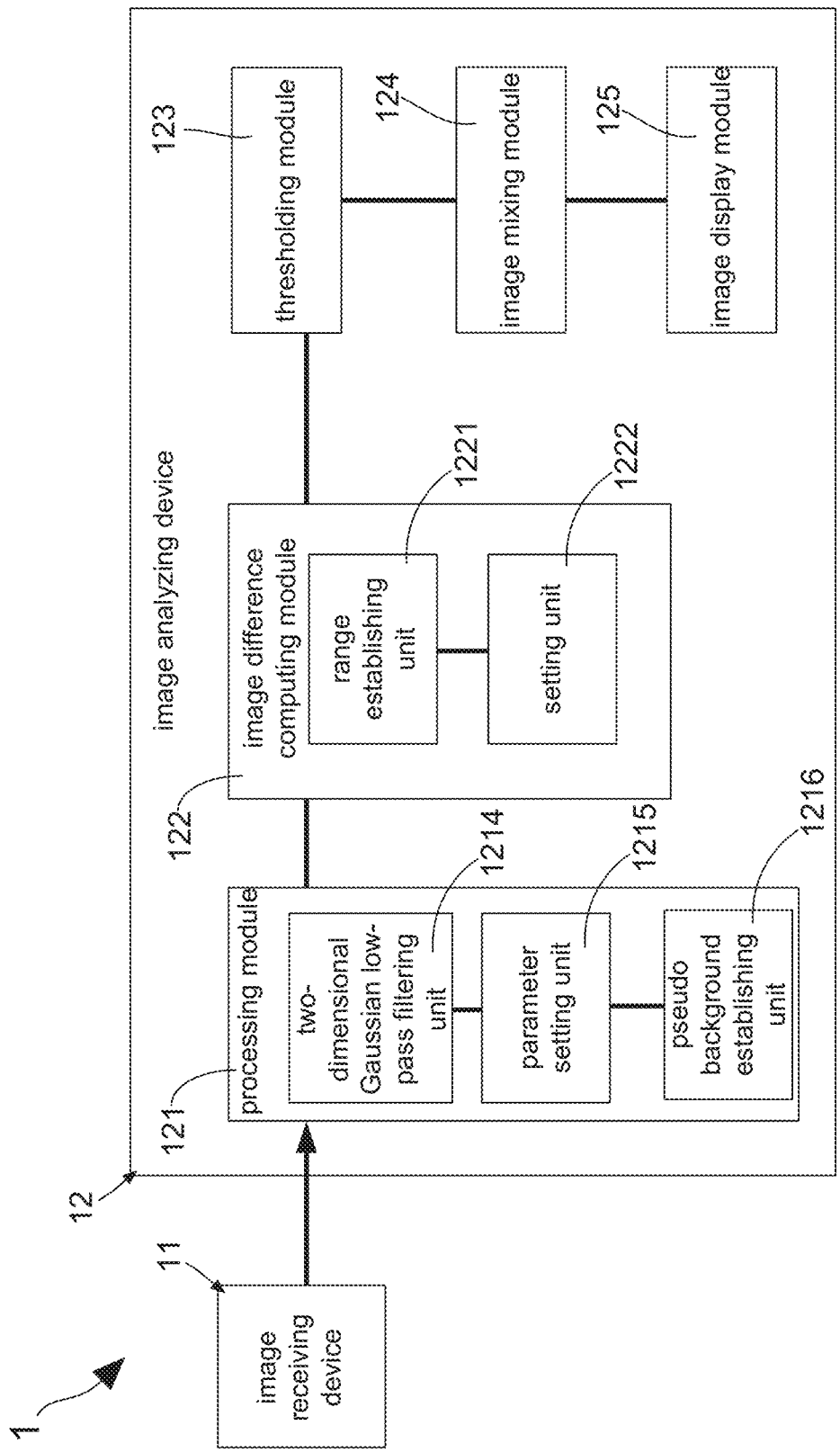
FIG. 2 is a second architecture diagram illustrating a forgery detection system according to the invention.

After obtaining the indicator image $M_{\lambda,\gamma}$, the image analyzing device 12 performs a mixing operation on the indicator image $M_{\lambda,\gamma}$, and the input image I by the image mixing module 124, wherein the hybrid operation system obtains a background noise distribution control image by using alpha blending. Finally, the image display module 125 displays the background noise distribution control image, thereby completing the image detection of the input image I Please refer to FIG. 2, wherein FIG. 2 is a second architecture diagram illustrating a forgery detection system according to the invention. The second forgery detection system 1 of the present invention comprises: an image receiving device 11 and an image analyzing device 12, the image receiving device 11 for receiving an input image I. Furthermore, the input image I is a biomedical experimental image formed by a western blot or a polymerase chain reaction result, and the image analyzing device 12 further comprises: a processing module 121, an image difference computing module 122, a thresholding module 123, an image mixing module 124, and an image display module 125, wherein the processing module 121 for receiving the input image I, and further perform a pseudo background on the input image I, thereby obtaining a pseudo background image $\mathcal{J}$, wherein the image difference computing module 122 is coupled to the processing module 121 for performing an image difference operation on the pseudo background image $\mathcal{J}$ and the input image I to obtaining a volatility pattern $\mathcal{V}$, and the thresholding module 123 is coupled to the image difference computing module 122 for performing a binarization process on the volatility pattern $\mathcal{V}$ to obtain an indicator image $M_{\lambda,\gamma}$, and the image mixing module 124 is coupled to the thresholding module 123 for performing a mixing operation on the indicator image $M_{\lambda,\gamma}$ and the input image I to obtain a background noise distribution control image, and the image display module 125 is coupled to the image mixing module 124 for determining whether the background noise distribution control the image is altered, whereby the image detection is accomplished the input image I.

In the second forgery detection system 1, the processing module 121 further comprises: a two-dimensional Gaussian low-pass filtering unit 1214, a parameter setting unit 1215 and a pseudo background establishing unit 1216. Different from the first forgery detection system 1, when the pseudo background generation processing is performed, the parameter setting unit 1215 sets a parameter setting value of the two-dimensional Gaussian low-pass filtering unit 1214. The pseudo background establishing unit 1216 performs a Gaussian blurring on the input image I by completing the set two-dimensional Gaussian low-pass filtering unit 1214 to establish the pseudo background image $\mathcal{J}$. In this way, when the quantization parameter is insufficient or does not need to be quantitatively analyzed, the two-dimensional Gaussian low-pass filtering unit 1214 can be used instead of the quantization parameter establishing unit 1211 and the similar computing unit 1212.

Figure 3:
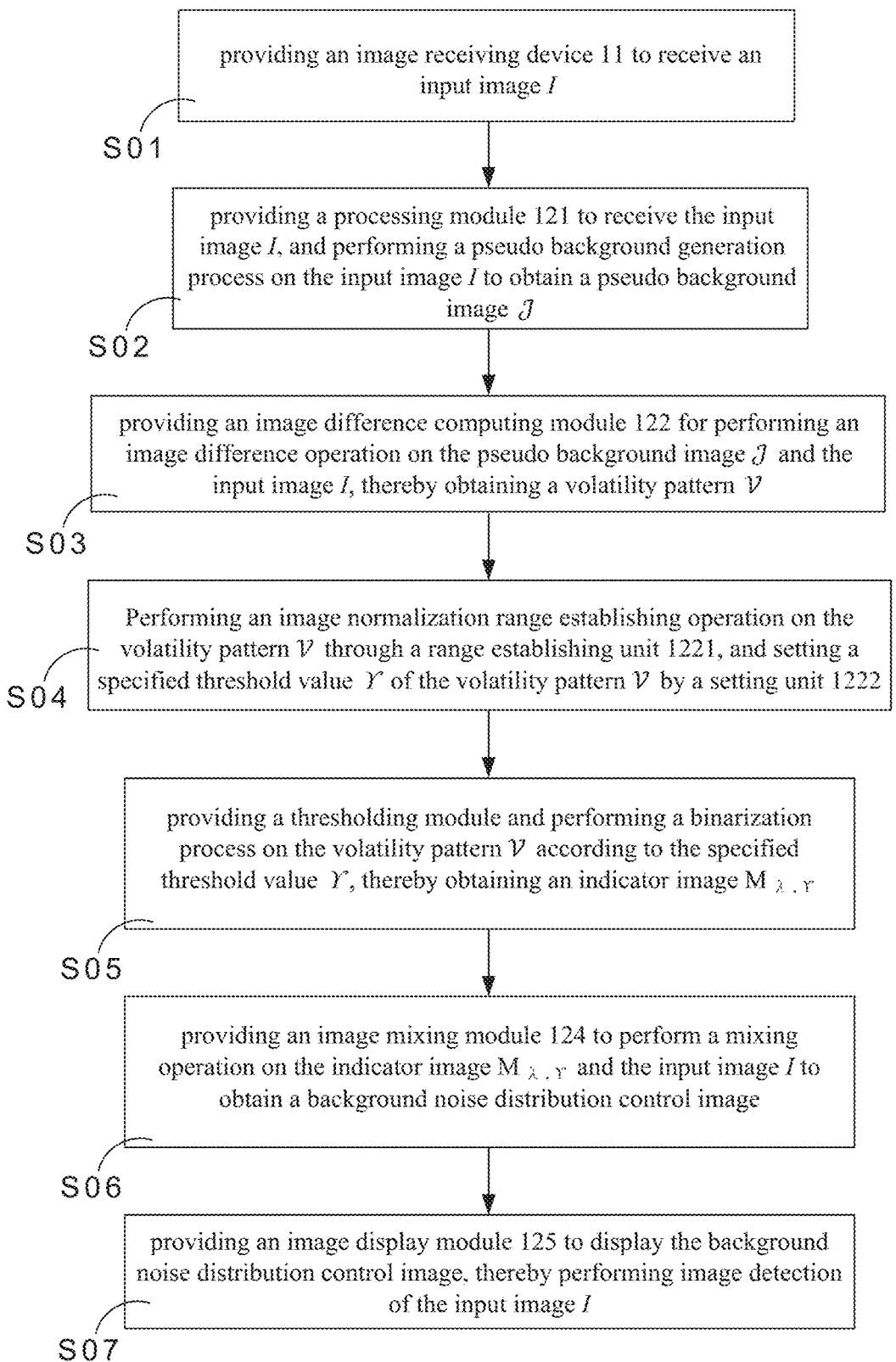
FIG. 3 show the flowchart of a method of forgery detection for falsified biomedical experiment images according to the invention.

Therefore, through above descriptions, all constituting elements of the forgery detection system proposed by the present invention have been introduced completely and clearly, and then the detection method of the artificially modified biomedical experimental image proposed by the present invention will be further illustrated by the drawings. Please refer to FIG. 1, FIG. 2 and FIG. 3, wherein FIG. 3 show the flowchart of a method of forgery detection for falsified biomedical experiment images according to the invention, the method of forgery detection for falsified biomedical experiment images, comprising the steps of:

In the step (S01), providing an image receiving device 11 to receive an input image I, then, in the step (S02), providing a processing module 121 to receive the input image I, and performing a pseudo background generation process on the input image I to obtain a pseudo background image $\mathcal{J}$, then, in the step (S03), providing an image difference computing module 122 for performing an image difference operation on the pseudo background image $\mathcal{J}$ and the input image I, thereby obtaining a volatility pattern $\mathcal{V}$.

After the volatility pattern $\mathcal{V}$ is obtained, in the step (S04), performing an image normalization range establishing operation on the volatility pattern $\mathcal{V}$ through a range establishing unit 1221, and setting a specified threshold value γ of the volatility pattern $\mathcal{V}$ by a setting unit 1222, then, in the step (S05), providing a thresholding module and performing a binarization process on the volatility pattern $\mathcal{V}$ according to the specified threshold value γ, thereby obtaining an indicator image $M_{\lambda,\gamma}$. After obtaining the indicator image $M_{\lambda,\gamma}$, then, in the step (S06), providing an image mixing module 124 to perform a mixing operation on the indicator image $M_{\lambda,\gamma}$ and the input image I to obtain a background noise distribution control image, then, in the step (S07), providing an image display module 125 to display the background noise distribution control image, thereby performing image detection of the input image I.

In the first embodiment, the step (S02) comprises following detail steps: step (21a), performing an image quantization parameter establishment operation on the input image I by using a quantization parameter establishing unit 1211 of the processing module 121, and establishing an operation result according to the image quantization parameter to establish a quantization parameter matrix, then, in the step (22a), performing a similarity calculation on the input image I and the pseudo background image $\mathcal{J}$ by a similar computing unit 1212 of the processing module 121, then, in the step (23a), a pseudo background generating unit 1213 of the processing module 121 performs a Fourier transform on the quantization parameter matrix and the result of the similarity calculation to generate the pseudo background image $\bar{J}$.

In the second embodiment of the present invention, the step (S02) comprises following detail steps: step (21b), providing a two-dimensional Gaussian low-pass filtering unit 1214, then, in the step (22b), setting a parameter setting value of the two-dimensional Gaussian low-pass filtering unit 1214 by a parameter setting unit 1215 of the processing module 121, then, in the step (23b), performing a Gaussian blurring on the input image I by a pseudo background establishing unit 1216 of the processing module 121 to establish the pseudo background image $\bar{J}$.

Therefore, the forgery detection system and its method for biomedical falsified experiment images of the present invention have been clearly and completely described above. Furthermore, the inventors have demonstrated the artificial alteration of the present invention by the following experimental methods. The detection system of the biomedical experimental image has the function of forging identification in the image of the molecular biology experiment.

Figure 4:
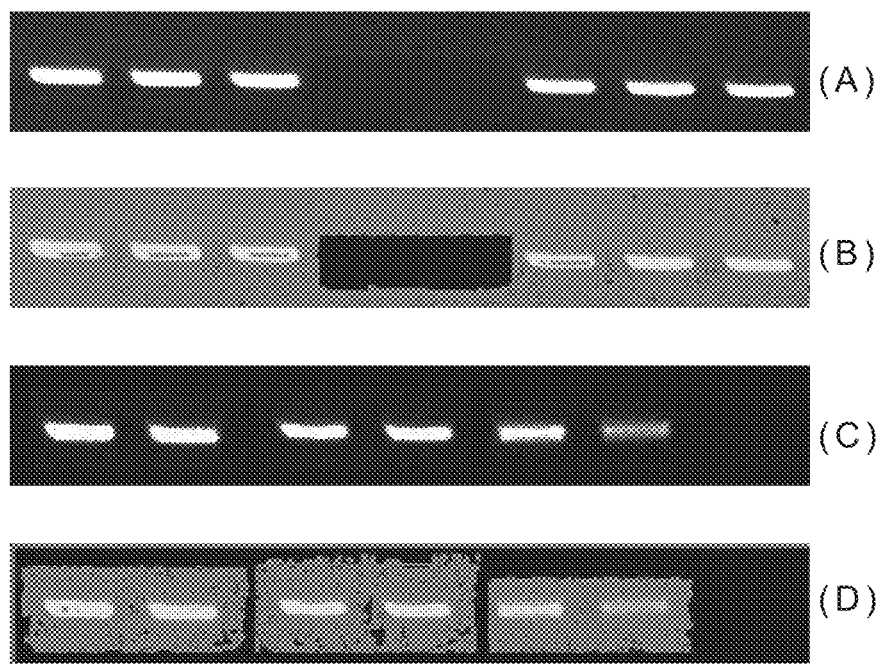
FIG. 4 shows a result of artificially altered images.

Please refer to FIG. 4, which shows a result of artificially altered images. In FIG. 4, (A) and (C) are images of the altered PCR products for experimental display, and (B) and (D) are the results of the analysis of the forgery detection system for the biomedical experimental images by (A) and (C), respectively. The (A) is created by removing the rectangular area from the original image. In addition, three rectangular areas are copied independently of other PCR images, they are pasted on the same template, and then the brightness and contrast of the image are appropriately adjusted to form a (C). Therefore, the (C) is a common experimental image containing six positive bands and one negative band. According to the analysis result of the Forgery detection system for biomedical experiment images of the present invention, the black rectangle in the (B) is the empty area of the indicator image M the empty area corresponds to the rectangular area removed from the source image. In addition, the rectangular area indicated by (D) is the three rectangular areas copied by the (C) PCR image, thereby revealing the pattern that is invisible or retained on the post-processed image.

Therefore, through above descriptions, all constituting elements of the forgery detection system and its method for falsified biomedical experiment images proposed by the present invention have been introduced completely and clearly; in summary, the present invention includes the advantages of:

The present invention provides a forgery detection system and its method for falsified biomedical experiment images. The forgery detection system mainly comprises a processing module 121, an image difference computing module 122, a thresholding module 123, and an image mixing module 124 are formed in an image analyzing device 12 in the form of a library, a variable or an operand. Moreover, the processing module 121 has a quantization parameter establishing unit 1211, a similar computing unit 1212, and a pseudo background generating unit 1213. The purpose of the image analyzing device 12 is to display an artificial image on the input image. In addition, when the quantization parameter is insufficient or does not need to be quantitatively analyzed, the processing module 121 specially designed by the present invention has a two-dimensional Gaussian low-pass filtering unit 1214, a parameter setting unit 1215 and a pseudo background establishing unit 1216, so that the processing module 121 only needs to perform image detection of the input image by using Gaussian blurring.

The above description is made on embodiments of the present invention. However, the embodiments are not intended to limit scope of the present invention, and all equivalent implementations or alterations within the spirit of the present invention still fall within the scope of the present invention.

What is claimed is:

1. A forgery detection system, comprising:
   an image receiving device configured to receive an input image;
   an image analysis device configured to perform a plurality of functions consisting of:
   (a) performing a pseudo background generation process on the input image, thereby obtaining a pseudo background image;
   (b) performing an image difference operation on the pseudo background image and the input image to obtain a volatility pattern;
   (c) performing a binarization process on the volatility pattern to obtain an indictor image;
   (d) performing a mixing operation on the indicator image and the input image to obtain a background noise distribution control image; and
   (e) displaying the background noise distribution control image, thereby completing the image detection of the input image.

2. The forgery detection system of claim 1, wherein the image analysis device is any of the following: a tablet, a notebook, a desktop, or a central processing unit.

3. The forgery detection system of claim 1, wherein the image analysis device performs the foregoing function (a) through following steps of:
   (a1) performing an image quantization parameter establishing operation on the input image, and establishing an operation result according to the image quantization parameter to establish a quantization parameter matrix;
   (a2) performing a similarity calculation on the input image and the pseudo background image; and
   wherein the pseudo background image is generated by performing a Fourier transform on the quantization parameter matrix and the result of the similarity calculation.

4. The forgery detection system of claim 1, wherein the image analysis device performs the foregoing function (b) through following steps of:
   (b1) performing image normalization on the volatility pattern; and
   (b2) setting a specified threshold value of the one of the volatility patterns;
   wherein the fluctuation pattern is subjected to the binarization processing according to the specified threshold value to obtain the indicator image.

5. The forgery detection system of claim 4, wherein the image analysis device performs the foregoing function (b) through following steps of:
   (b3) setting a parameter setting value of the two-dimensional Gaussian low-pass filtering unit; and
   (b4) performing a Gaussian blurring on the input image to establish the pseudo background image.

6. The forgery detection system of claim 1, wherein the mixing operation is accomplished using an alpha blending algorithm.

7. The forgery detection system of claim 1, wherein the input image is a biomedical experimental image formed by a western blot or a polymerase chain reaction.

8. The forgery detection system of claim 1, wherein the image analysis device in the form of a library, a variable, or an operand.

\* \* \* \* \*